(12) United States Patent
Lee et al.

(10) Patent No.: US 9,069,110 B2
(45) Date of Patent: Jun. 30, 2015

(54) BACKLIGHT UNIT AND DISPLAY DEVICE

(75) Inventors: Kum Tae Lee, Seoul (KR); Kyung Min Koh, Seoul (KR); Min Sang Kim, Seoul (KR); Bang gun Kim, Seoul (KR); Nam Seok Oh, Seoul (KR); Tae jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 12/847,464

(22) Filed: Jul. 30, 2010

(65) Prior Publication Data

US 2011/0026243 A1 Feb. 3, 2011

(30) Foreign Application Priority Data

Jul. 31, 2009 (KR) .................. 10-2009-0070744
Jul. 31, 2009 (KR) .................. 10-2009-0070745

(51) Int. Cl.
*F21V 7/04* (2006.01)
*F21V 8/00* (2006.01)

(52) U.S. Cl.
CPC ............ *G02B 6/0051* (2013.01); *G02B 6/0046* (2013.01); *G02B 6/008* (2013.01); *G02B 6/0088* (2013.01); *G02B 6/0091* (2013.01)

(58) Field of Classification Search
CPC .................. B01L 2200/0673; B01L 3/50215; G02B 6/0046; G02B 6/008; G02B 6/0088
USPC ................... 362/616, 97.2, 97.1, 613; 349/65
See application file for complete search history.

(56) References Cited

U.S. PATENT DOCUMENTS

| 5,497,293 | A | * | 3/1996 | Noguchi et al. ............... 362/609 |
| 6,480,245 | B1 | * | 11/2002 | Sakamoto et al. .............. 349/59 |
| 7,806,546 | B2 | * | 10/2010 | Hsu et al. ..................... 362/97.2 |
| 8,009,245 | B2 | * | 8/2011 | Kim et al. ........................ 349/65 |
| 2001/0017774 | A1 | * | 8/2001 | Ito et al. ........................... 362/31 |
| 2003/0137824 | A1 | | 7/2003 | Shinohara et al. |
| 2005/0276076 | A1 | * | 12/2005 | Shin .............................. 362/609 |
| 2006/0221638 | A1 | | 10/2006 | Chew et al. |
| 2007/0247871 | A1 | | 10/2007 | Yoo |
| 2008/0101068 | A1 | * | 5/2008 | Kitamura et al. ............. 362/246 |
| 2009/0213574 | A1 | * | 8/2009 | Chang et al. ................. 362/97.1 |
| 2009/0273732 | A1 | * | 11/2009 | Shimura et al. ................. 349/65 |
| 2010/0060818 | A1 | | 3/2010 | Ajichi et al. |

FOREIGN PATENT DOCUMENTS

| CN | 1434336 A | 8/2003 |
| EP | 1 918 768 A2 | 5/2008 |
| JP | 8-6721 A2 | 1/1996 |
| JP | 11-64611 A2 | 3/1999 |
| JP | 2000-171641 A | 6/2000 |
| JP | 2002-072204 A | 3/2002 |
| JP | 2002-93233 A | 3/2002 |
| JP | 2002-109936 A | 4/2002 |

(Continued)

*Primary Examiner* — Anh Mai
*Assistant Examiner* — Jessica M Apenteng
(74) *Attorney, Agent, or Firm* — Birch, Stewart, Kolasch & Birch, LLP

(57) ABSTRACT

A backlight unit according to an embodiment includes: a plurality of optical assemblies each including a light source generating light, a light guide plate having a first part through which light travels inside and a second part diffusing upward the light traveling inside through the first part; and a diffusion pattern selectively disposed at the portions corresponding to interfaces between the light guide plates on the optical assemblies.

20 Claims, 12 Drawing Sheets

(56) References Cited

FOREIGN PATENT DOCUMENTS

| | | |
|---|---|---|
| JP | 2002-116440 A | 4/2002 |
| JP | 2002-287138 A | 10/2002 |
| JP | 2004-206916 A | 7/2004 |
| JP | 2007-335324 A | 12/2007 |
| JP | 2009-129539 A | 6/2009 |
| JP | 2009-152152 A | 7/2009 |
| KR | 20010085460 A | 9/2001 |
| KR | 10-2006-0106774 A | 10/2006 |
| KR | 10-2007-0040011 A | 4/2007 |
| KR | 10-2007-0104149 A | 10/2007 |
| KR | 100855248 B1 | 8/2008 |
| KR | 10-2009-0019208 A | 2/2009 |
| KR | 10-2009-0050217 A | 5/2009 |
| KR | 10-2009-0073433 A | 7/2009 |
| WO | WO 2009/016950 A1 | 2/2009 |
| WO | WO 2009/098809 A1 | 5/2009 |
| WO | WO 2009/147877 A1 | 12/2009 |

* cited by examiner

BACKLIGHT UNIT AND DISPLAY DEVICE

The present application claims priority under 35 U.S.C. §119 (a) of Korean Patent Application No. 10-2009-00070744 filed on Jul. 31, 2009 and 10-2009-00070745 filed on Jul. 31, 2009, which are hereby incorporated by references in its entirety.

BACKGROUND OF THE INVENTION

1. Field of the Invention

The embodiment relates to a backlight unit equipped with an optical assembly and a display device.

2. Description of the Related Art

Light emitting diodes (LED) may be light emitting sources by being made of GsAs-based, AlGaAs-based, GaN-based, InGaN-based, and InGaAlP-based compound semiconductor materials.

These light emitting diodes are packaged and used as light emitting devices that produce various colors, and the light emitting devices are used as light sources in various fields, such as a light indicator showing colors, a character display, and a video display.

SUMMARY OF THE INVENTION

An embodiment provides a backlight unit having a new structure and a display device.

An embodiment provides a backlight unit having uniform luminance and a display device.

A backlight unit according to an embodiment includes: a plurality of optical assemblies each including a light source generating light, a light guide plate having a first part through which light travels inside and a second part diffusing upward the light traveling inside through the first part; and a diffusion pattern selectively disposed at the portions corresponding to interfaces between the light guide plates on the optical assemblies.

A display device according to an embodiment includes: a backlight unit that includes a plurality of optical assemblies each including a light source generating light, a light guide plate having a first part through which light travels inside and a second part diffusing upward the light traveling inside through the first part, and a diffusion pattern selectively disposed at the portions corresponding to interfaces between the light guide plates on the optical assemblies; and a display panel disposed above the backlight unit, provided with light from the backlight unit, and displaying video.

DETAILED DESCRIPTION OF THE PREFERRED EMBODIMENTS

Figure 1:
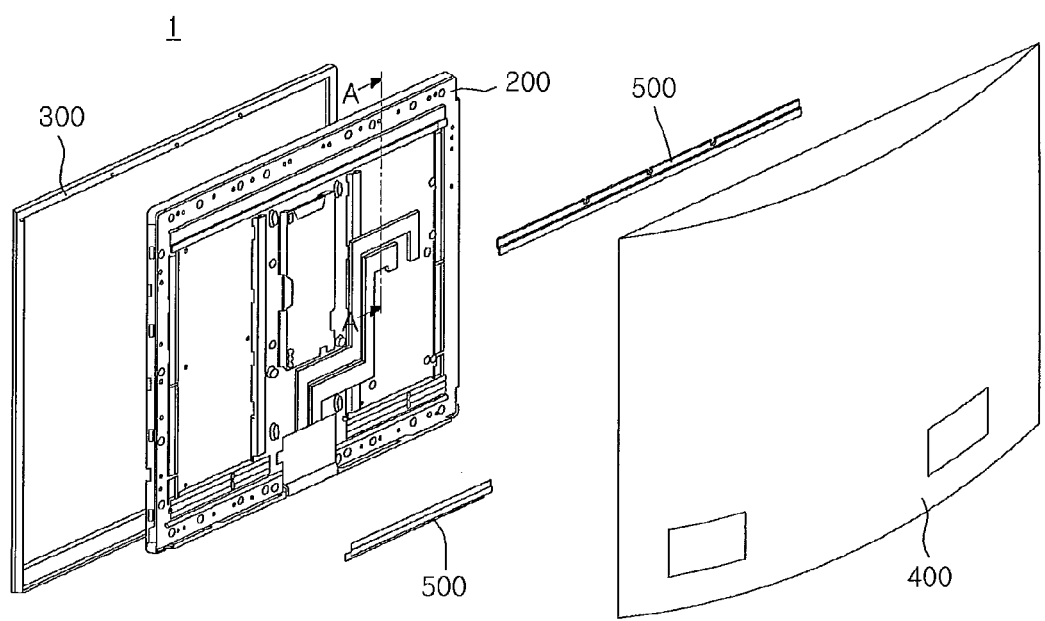
FIG. 1 is an exploded perspective view of a display device according to an embodiment.

Embodiments are described hereafter with reference to the accompanying drawings, as follows. The embodiments described hereafter may be modified in various ways and the technical scope of the embodiments is not limited to the following description. The embodiments are provided for those skilled in the art to fully understand the present invention. Therefore, the shape and size of the components shown in the drawings may be exaggerated for more clear explanation.

FIG. 1 is an exploded perspective view of a display device according to an embodiment.

Referring to FIG. 1, a display device 1 according to an embodiment includes a display module 200, a front cover 300 and a back cover 400 which cover the display module 200, and fixing members 500 that fix the display module 200 to the front cover 300 and/or the back cover 400.

The fixing members 500 have one side fixed to the front cover 300 by fasteners, such as screws, and the other side supporting the display module 200 to the front cover 300 such that the display module 200 is fixed to the front cover 300.

Although it is exemplified in this embodiment that the fixing members 500 have long bar shapes extending in one direction, for example, it may also be possible to implement a configuration in which the display module 200 is directly fixed to the front cover 300 or the back cover 400 by fasteners, without using the fixing members 500.

Figure 2:
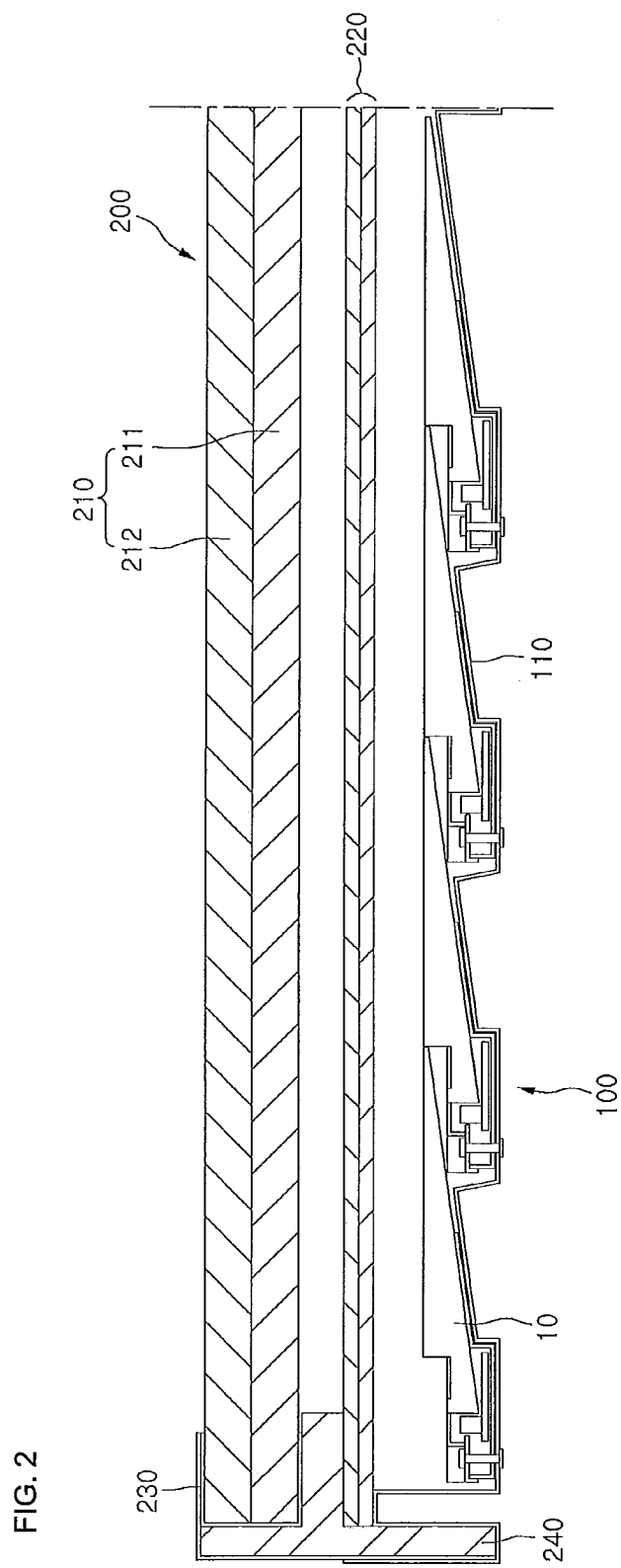
FIG. 2 is a cross-sectional view of a display module, taken along the line A-A of FIG. 1.

FIG. 2 is a cross-sectional view of a display module, taken along the line A-A of FIG. 1.

Referring to FIG. 2, the display module 200 includes: a display panel 210 displaying video; a backlight unit 100 supplying light to the display panel 210; a bottom frame 110 defining the lower external shape of the display module 200; a panel supporter 240 supporting the display panel 210 thereunder; and a top frame 230 supporting the display panel 210 thereon and defining the edge of the display module 200. The bottom frame 110 may be formed in a box shape with the top open to accommodate the backlight unit 100.

Further, one side of the bottom frame 110 may be fixed to one side of the top frame 230. For example, the bottom frame 110 and the top frame 230 may be fixed to a side of the display module 200, that is, the portion where the bottom frame 110 and the top frame 230 overlap, by inserting fasteners, such as screws.

Though not shown in detail, the display panel 210, for example, includes a first substrate 211 and a second substrate 222 bonded opposite to each other with a uniform cell gap defined, and a liquid crystal layer interposed between the first substrate 211 and a second substrate 212. A plurality of gate lines and a plurality of data lines crossing the gate lines are formed on the first substrate 211 and thin film transistors (TFT) may be formed at the intersections of the gate lines and the data lines. Color filters may be formed on the second substrate 212. The structure of the display panel 210 is not limited thereto and the display panel 210 may have various structures. According to another example, the first substrate 211 may include color filters, in addition to the thin film transistors. Further, the display panel 210 may be formed in various structures in accordance with the way of driving the liquid crystal layer.

Though not shown, a gate driving PCB (printed circuit board) supplying scan signals to the gate lines and a data driving PCB (printed circuit board) supplying data signals to the data lines may be disposed at the edge of the display panel 210.

A polarizing film (not shown) may be above or under the display panel 210.

An optical sheet 220 may be disposed between the display panel 210 and the backlight unit 100. Further, the optical sheet 220 may include a diffusion sheet (not shown) and/or a prism sheet (not shown).

Although it is exemplified that the optical sheet 220 is spaced apart from the backlight unit 100 in FIG. 2, the optical sheet 220 and the backlight unit 100 may be arranged in close contact with each other or at least a portion of the optical sheet 220 may be in contact with the backlight unit 100.

The diffusion sheet uniformly diffuses light emitted through the polarizing plate and the diffused light may be collected to the display panel by the prism sheet. In this configuration, the prism sheet may be selectively formed by using a horizontal or/and a vertical prism sheet, and one or more illumination enhancement film. The type or number of the optical sheet 220 may be modified within the technical spirit of the embodiments and is not limited thereto.

Meanwhile, the backlight unit 100 includes a plurality of optical assemblies 10 defining a plurality of divided driving regions. Further, the display panel 210 may be divided into a plurality of divided regions corresponding to the optical assemblies 110, and the optical assemblies 10 can adjust the luminance of the display panel 210 in response to the gray peak values or the color coordinate signals of the divided regions.

The configuration of the backlight unit 100 is described hereafter in detail.

Figure 3:
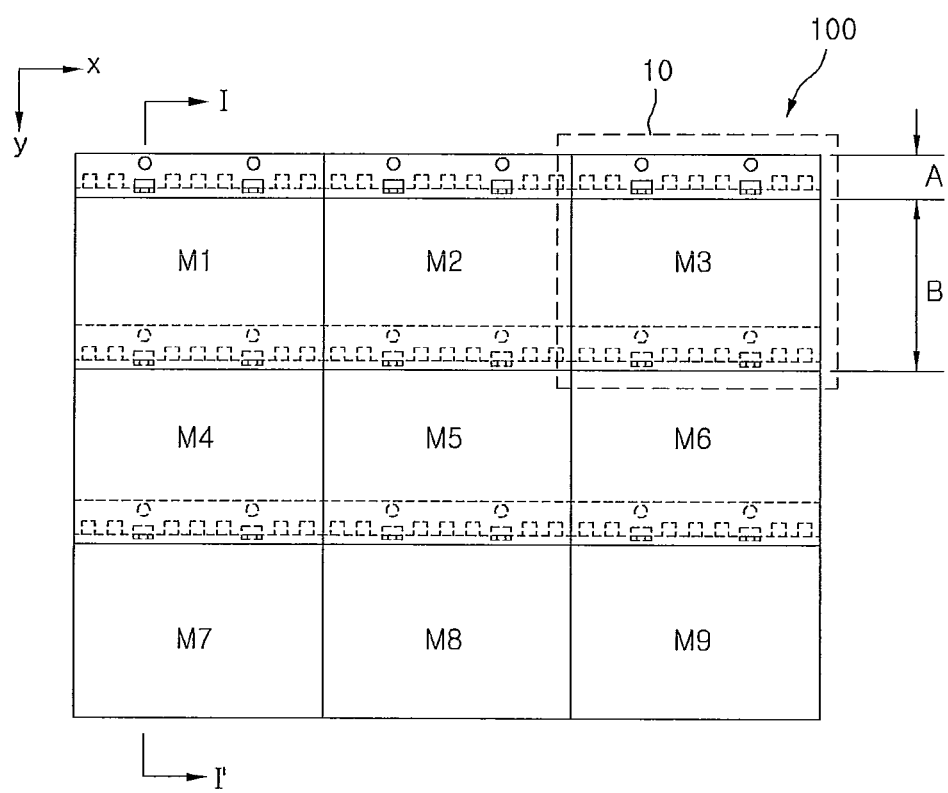
FIG. 3 is a plan view of the backlight unit according to an embodiment.
Figure 4:
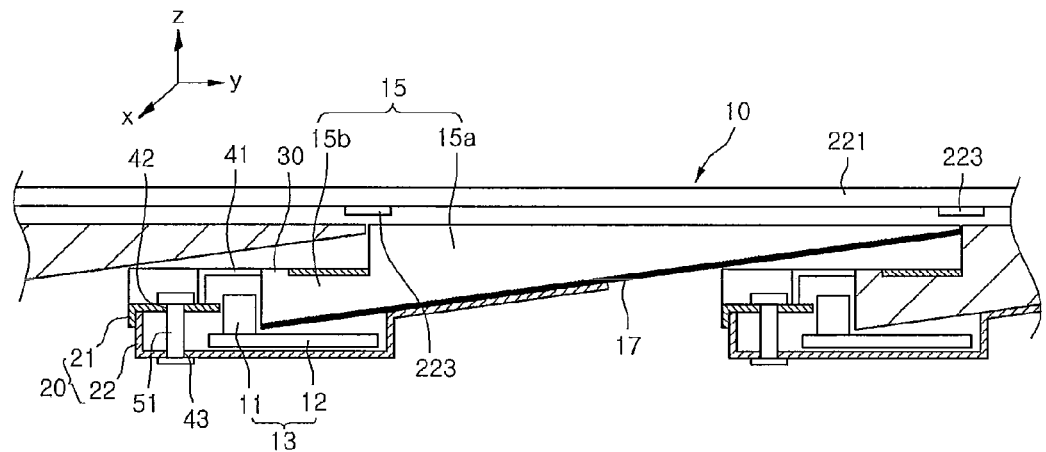
FIG. 4 is a cross-sectional view of the backlight unit, taken along the line I-I' of FIG. 1.

FIG. 3 is a plan view of the backlight unit according to an embodiment and FIG. 4 is a cross-sectional view of the backlight unit taken along the line I-I' of FIG. 1.

Referring to FIGS. 3 and 4, the optical assemblies 10 in the backlight unit 100 may be arranged in matrix at N and M positions (N and M are natural numbers above 1), respectively, in x-axis and y-axis.

The optical assemblies 10 may be arranged to overlap each other at predetermined regions.

The optical assembly 10 may be divided into a first region A and a second region B in a plan view. A light source 13, a first part 15b of a light guide plate 15, and a side cover 20 may be disposed in the first region A. The second region B diffuses the light provided from the first region A throughout the front surface. The first region A may be disposed under the second region B of an adjacent optical assembly 10.

The optical assemblies 10 may be arranged such that the first regions A overlap each other not to be shown in a plan view. However, the first regions A of the outermost optical assemblies 10 in the backlight unit 100 may not overlap to be shown in a plan view. The second regions B may be arranged with the front-back interfaces and the left-right interfaces in close contact with each other.

The optical assemblies 10 are driven in an edge-lit backlight type in which light travels inside through a side of the light guide plate 15, and arranged in a direct backlight type in the region corresponding to the display panel 210 such that they can independently operate. Therefore, it is possible to remove a problem that the light emitting diodes 11 used for light sources are shown like hot spots in a picture and it is also possible to achieve a slime backlight unit by reducing the thickness of the light guide plate 15 and the number of optical films.

For example, nine optical assemblies M1~M9 may be arranged in a 3×3 matrix in the backlight unit 100 shown in FIG. 1.

The optical assemblies 10 may be independently manufactured and arranged adjacent to each other to form a module-typed backlight unit. The module-typed backlight unit can supply, as a backlight means, light to a display panel.

The backlight unit 100 according to an embodiment may be driven in an entire driving type or a partial driving type, such as local dimming and impulsive types. The driving type of the light emitting diode 11 may be variously modified in accordance with the circuit design and is not limited thereto. Accordingly, according to the embodiment, it is possible to increase the color contrast ratio and clearly display an image in the light and dark regions on a picture, thereby improving the image quality.

That is, since the backlight unit 100 is divided and operated in a plurality of divided driving region, it is possible to improve the contrast ratio and resolution by associating the luminance of the divided driving regions with the luminance of a video signal, and decreasing the luminance of the dark region and increasing the luminance of the light region in the picture.

When the backlight unit 100 is driven in the local dimming type, the display panel can be divided and driven in a plurality of divided regions, corresponding to the optical assemblies, and it is possible to independently adjust the luminance of the optical assemblies in response to the peak values of the gray level and the color coordinate signals of the divided regions.

For example, it is possible to radiate light by independently driving only the optical assembly M5.

The backlight unit 100 according to the embodiment has the effect of reducing the cost by decreasing power consumption, using the partial driving type.

Further, the backlight unit 100 according to the embodiment can be achieved in a simple manufacturing process of assembling the optical assemblies 10, and it is possible to improve productivity by minimizing loss that may be caused in the assembly process. Further, it is possible to reduce defects due to scratches on the light guide plate and prevent optical mura in the assembly process, such that it is possible to improve reliability of the process and product quality.

The backlight unit 100 according to the embodiment can be mass-produced by standardizing the optical assemblies 10, which can be applied to backlight units having various sizes.

It is possible to easily repair the backlight unit 100 according to the embodiment, because when any one of the optical assemblies 10 of the backlight unit 100 is damaged, it only has to replace only the damaged optical assembly, without replacing the entire backlight unit 100, thereby reducing the cost of replacing the parts.

The optical assemblies 10 according to the embodiment and the backlight unit 100 equipped with the assemblies are strong against external shock and environmental changes and have high durability.

The backlight unit 100 according to the embodiment can be easily applied to large display panels. Further, the embodiment has the advantage of achieving slim backlight unit and display module.

Figure 5:
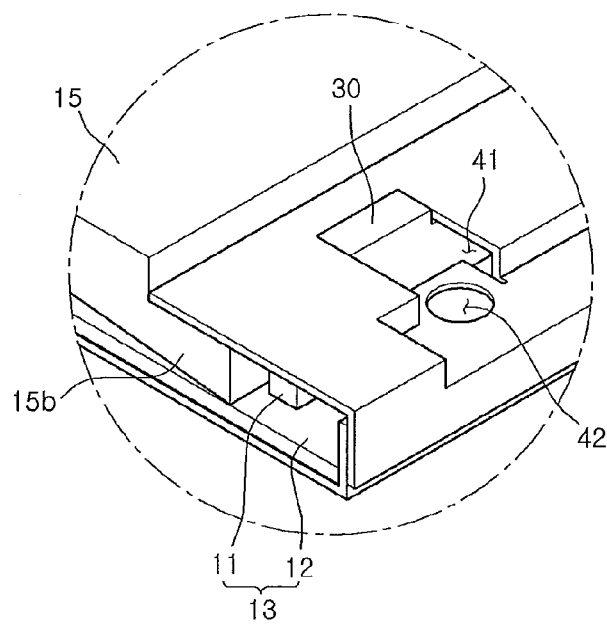
FIG. 5 is a partially enlarged view of the optical assembly shown in FIG. 4.

FIG. 5 is a partially enlarged view of the optical assembly shown in FIG. 4 and FIGS. 6 to 8 are perspective views showing parts of the optical assembly according to an embodiment.

Figure 6:
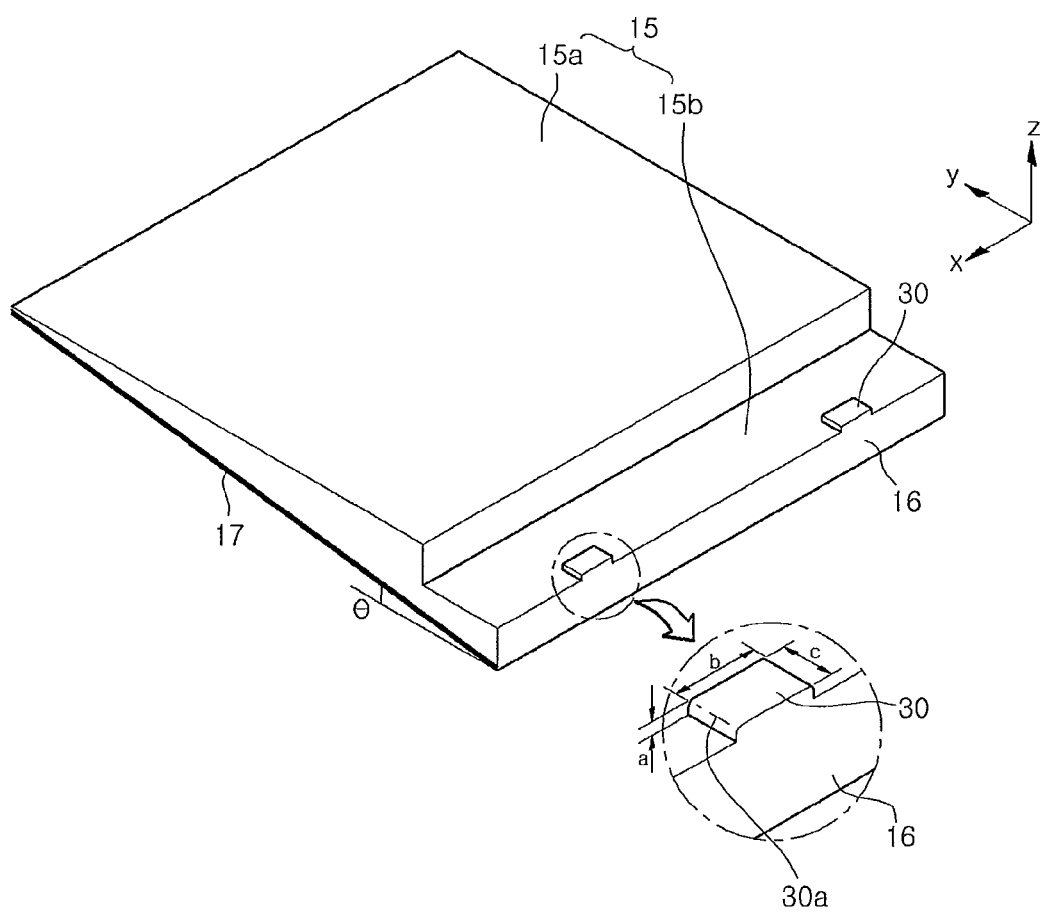
FIGS. 6 to 8 are perspective views showing parts of the optical assembly according to an embodiment.

Referring to FIGS. 4 to 6, the optical assembly 10 according to an embodiment includes a light source 13, a light guide plate 15, and a side cover 20 fixing the light source 13 and the light guide plate 15. Further, the side cover 20 includes a first side cover 21 and a second side cover 22, providing a fixed position with respect to the bottom frame 110. Further, the optical assembly includes a diffusion plate 221 disposed on the light guide plate 15.

The light guide plate 15 includes a first part 15b and a second part 15a. Further, the second part 15a may be composed of a top generating a surface light source, a bottom opposite to the top, and four sides.

The first part 15b may horizontally protrude from the lower portion of one side in the sides of the second part 15a A dispersion pattern (not shown) may be formed on the top or the bottom of the light guide plate 15. The dispersion pattern is formed of a predetermine pattern and improves light uniformity throughout the front surface of the light guide plate 15 by scattering and reflecting the incident light.

A reflective member 17 may be attached to the bottom of the light guide plate 15. The reflective member 17 reflects and guides the light, which travels into the light guide plate 15 through a side of the first part 15b, upward to the outside.

Further, the reflective member 17 may prevent interference of light generated from another optical assembly 10 overlapping the corresponding optical assembly.

The first part 15b may protrude from the lower portion of one side of the light guide plate 15.

The first part 15b has protrusions 30 protruding from the top at a predetermine height 'a'. The protrusions 30 may be formed at least two positions on the top of the first part 15b in the x-axis direction.

The protrusions 30 may have various shapes, for example, similar to a rectangular hexahedron. The protrusions 30 can prevent the light guide plate 15 from shaking in the x-axis and y-axis directions by locking to the first side cover 21.

One 30a of the edges of the protrusion 30 may be rounded to prevent the protrusion from cracking due to shock applied to the protrusion 30 by movement of the light guide plate 15.

The protrusion 30 may have a height 'a' of 0.3~0.6 mm from the top of the first part 15b. The protrusion 30 may have a width 'b' of 2-5 mm on the x-axis. The protrusion 30 may have a width 'c' of 1-3 mm on the y-axis.

The protrusions 30 may be positioned between adjacent light emitting diodes 11. Further, the protrusions 30 may be formed close to a light-in surface 16, on the top of the first part 15b. This is for preventing the protrusions 30 integrally formed with the light guide plate 15 from optically interfering the light generated from the light emitting diodes 11.

The positional relationship between the light emitting diodes 11 and the protrusions 30 on the top of the first part 15b of the light guide plate 15 and the size of the protrusions 30 are not limited this embodiment, and various positional relationships may be implemented in accordance with an optical design, parts, and the types of product.

The light guide plate 15 is made of a transparent material, which may include, for example, one of acryl resin, such as PMMA (polymethyl metaacrylate), and PET (polyethylene terephthlate), PC (poly carbonate), and PEN (polyethylene naphthalate) resin. The light guide plate 15 may be formed by extrusion molding.

On the other hand, since the optical assemblies 10 are used in the backlight unit 100 according to an embodiment, a small gap may be defined at the interface between the light guide plates 15 and light leaks out through the small gaps. Therefore, bright lines and dark lines are shown at the interfaces between the light guide plates 15, such that the bright lines and the dark lines may be observed in a grid shape, when seen from the front surface.

Non-uniform luminance distribution due to the bright lines and dark lines may deteriorate quality of the displayed video.

Therefore, the bright lines and dark lines at the interfaces between the light guide plates 15 are minimized in the backlight unit 100 according to an embodiment by disposing the diffusion plate 221 on the light guide plate 15 and forming a diffusion pattern 223 at positions, which correspond the interfaces between the light guide plates 15, on the diffusion plate 221.

The diffusion pattern 223 is provided with a reinforced light diffusion function, as compared with other portions of the diffusion plate 221, by additionally applying a diffusion material to the diffusion plate 221, and accordingly, the bright lines or the dark lines at the interfaces between the light guide plates 15 can be reduced.

The diffusion pattern 223 may be made of the same material as or a different material from the diffusion plate 221. The diffusion plate 223 may provide larger diffusion force than the diffusion force of the diffusion plate 221. In the diffusion plate 221, the portions corresponding to the interfaces between the light guide plates 15 may be thicker than other portions by the diffusion pattern 223.

For example, the diffusion pattern 223 may be a pattern printed.

The diffusion pattern 223 on the diffusion plate 221 may be made of a high-diffusion material including micro-balls helping light to be diffused. The high-diffusion material further contributes to light diffusion than the diffusion plate 221. For example, the high-diffusion material may be silicon including micro-balls, and for example, the micro-balls may be micro-particles contained in at least one of $TiO_2$, $SiO_2$, and $CaCO_3$.

The diffusion plate 221 may be in close contact with the light guide plates 15, or spaced at a predetermined distance.

Figure 12:
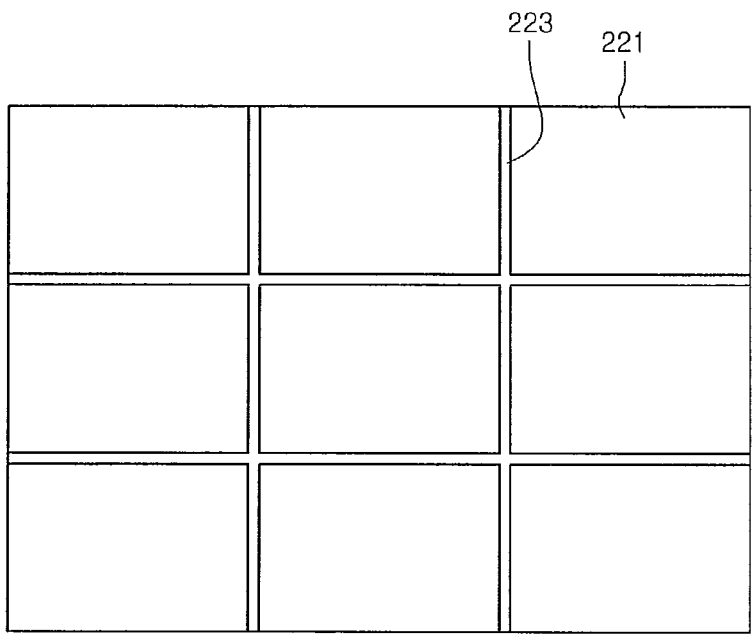
FIG. 12 is a plan view showing when a diffusion pattern is arranged on a diffusion plate in the backlight unit according to an embodiment.

The diffusion pattern 223 may be formed in a grid shape on the diffusion plate 221 in accordance with the arrangement of the light guide plates 15, as shown in FIG. 12, corresponding to the interfaces between the light guide plates 15. The diffusion pattern 223 is arranged to perpendicularly overlap the interfaces between the light guide plates 15, on the diffusion plate 221.

Since the diffusion plate 221 with the diffusion pattern 223 is disposed, it is possible to attenuate non-uniformity in luminance due to the bright lines or the dark lines, which are produced in the interfaces between the light guide plates 15, and correspondingly ensure uniformity of light.

Figure 13:
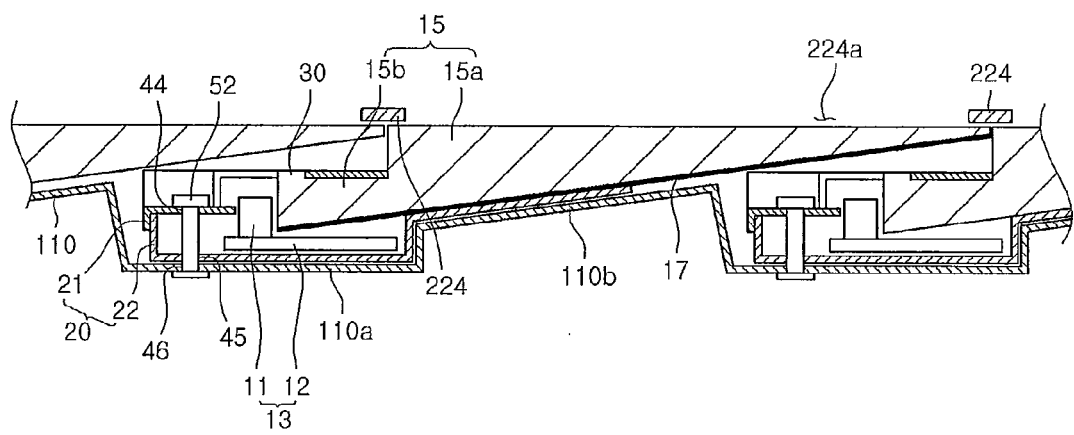
FIGS. 13 and 14 are views showing other examples of the diffusion pattern.
Figure 14:
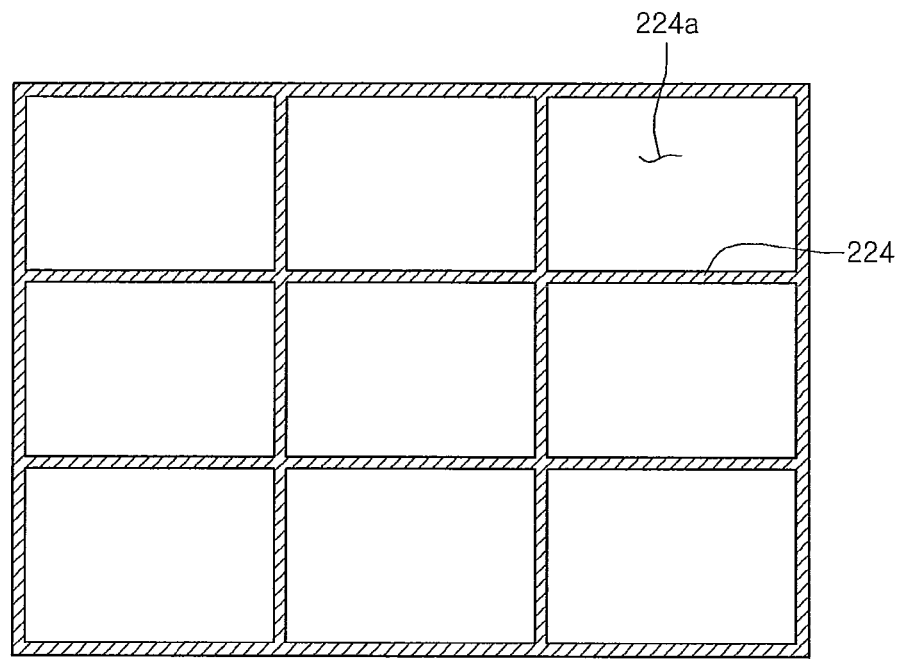

FIGS. 13 and 14 are views showing other examples of the diffusion pattern.

Referring to FIGS. 13 and 14, a diffusion pattern 224 is formed in a grid shape only at the positions corresponding to the interfaces between the light guide plates 15 and openings 224a may be formed at the other portions above the light guide plates 15. The diffusion pattern 224 may be in close contact with the light guide plates 15, or spaced at a predetermined distance. Obviously, the diffusion pattern 224 shown in FIGS. 13 and 14 may be attached to an additional diffusion plate.

The diffusion pattern 224 is arranged to perpendicularly overlap the interfaces between the light guide plates 15. Since the diffusion pattern 224 is disposed, it is possible to attenuate non-uniformity in luminance due to the bright lines or the dark lines, which are produced in the interfaces between the light guide plates 15, and correspondingly ensure uniformity of light.

Figure 7:
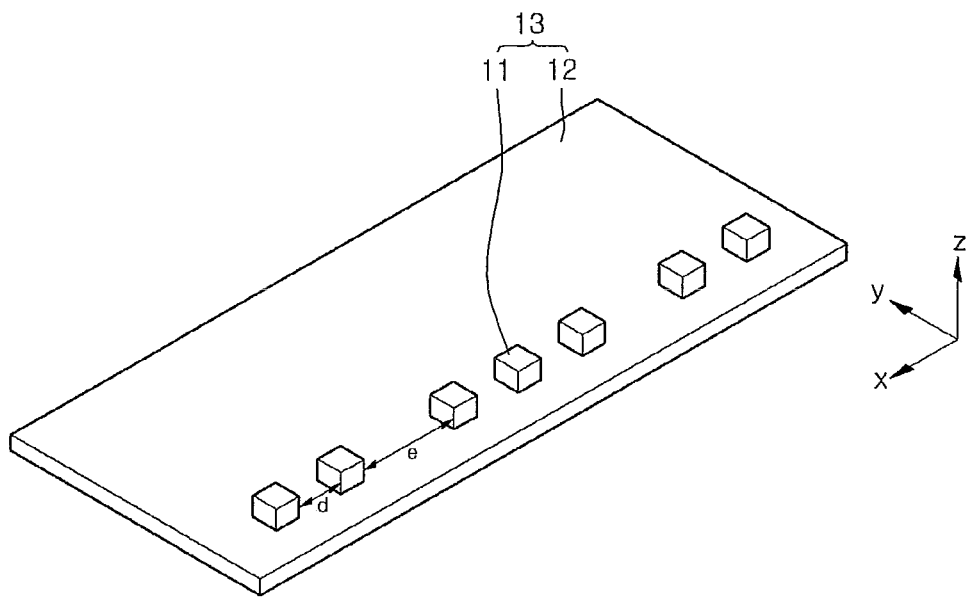

Referring to FIGS. 4 and 7, the light source 13 may include at least one light emitting diode 11 and a module substrate 12 with the light emitting diode 11 mounted thereon.

The light emitting diodes 11 may be aligned in the x-axis direction on the module substrate 12, close to the light-in surface 16 of the first part 15b.

The module substrate 12 may be a metal core PCB, an FR-4 PCB, a common PCB, or a flexible substrate, and modified in various ways within the technical scope of the embodiment.

A thermal pad (not shown) may be disposed under the module substrate 12. The thermal pad may be positioned between the module substrate 12 and the second side cover 22.

The light emitting diodes 11 may be implemented in a side emission type, and may be implemented by color LEDs producing at least one color of red, blue, and green, white LEDs, or UV (Ultraviolet) LEDs. Further, the color LEDs may include at least one of a red LED, a blue LED, and a green LED, and it is possible to change the arrangement of the light emitting diodes 11 and light emitted from the diodes within the technical scope of the embodiment.

The light emitted from the light emitting diodes 11 travels through a side of the first part 15b. The colors of the light emitted from the light emitting diodes 11 may be fixed in the light guide plate 15 having the first part 15b.

The light emitted from the light emitting diodes 11 is guided into the second part 15a through the first part 15b. The light traveling inside the second part 15b reflects upward to the outside from the reflective member 17 at the bottom. In this process, the light is dispersed and diffused by the dispersion pattern at the bottom of the light guide plate 15, such that uniformity of the light can be improved.

The light emitting diodes 11 may be arranged at a predetermined distance on the module substrate 12. The light emitting diodes 11 may be arranged diagonally with respect to the protrusions 30 on the light guide plate 15 in order to minimize optical effects from the protrusions 30. Accordingly, the distance between the light emitting diodes 11 around the protrusions 30 may be larger than the distance between the other light emitting diodes 11.

The distance between some of the light emitting diodes 11 may be larger than the distance between the other light emitting diodes 11 to ensure a space for combining the first side cover 21 with the second side cover 22 and minimize optical effects that are caused when the light guide plates 15 are pressed by the combining force.

For example, assuming that a first distance 'd' between adjacent light emitting diodes 11 is about 10 mm, a second distance 'e' of the light emitting diodes 11 around the space for the combination may be about 13 mm.

The light generated from the light emitting diodes 11 can be uniformly supplied to the second part 15a while the colors are mixed in the light guide plate 15 having the first part 15b.

Figure 8:
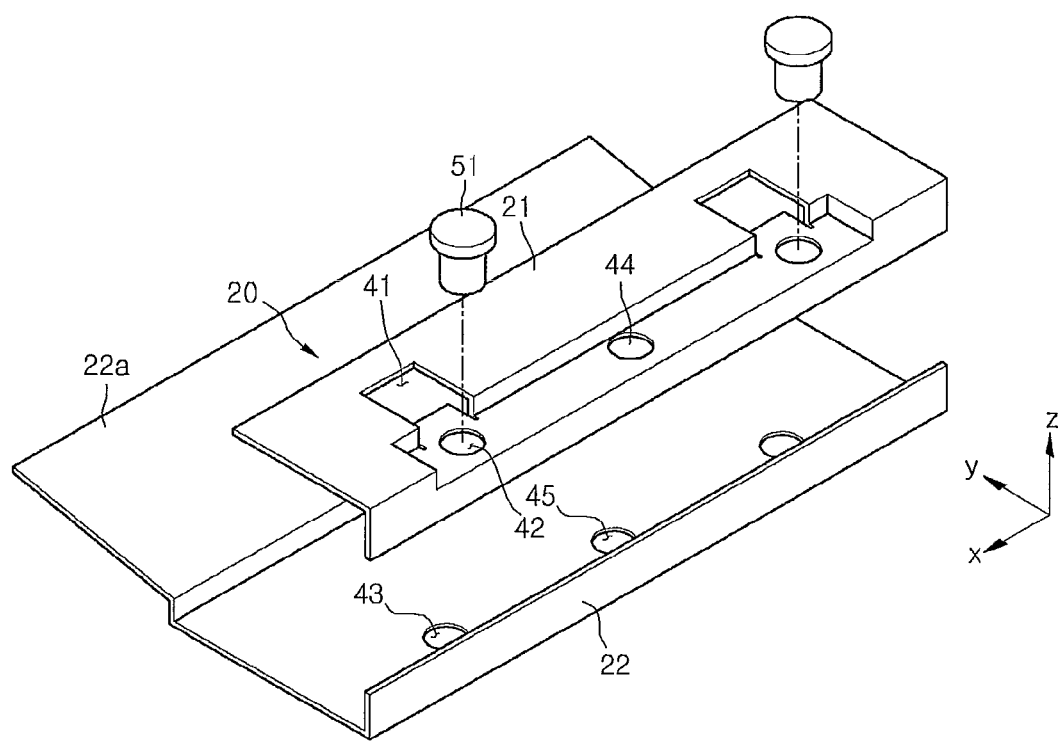

Referring to FIGS. 4 and 8, the side cover 20 is formed to cover the light source 13 and a portion of the light guide plate 15.

The side cover 20 may include a first side cover 21 disposed above the light source 13 and the first part 15b and a second side cover 22 disposed under the first part 15b.

The side cover 20 may be made of plastic or metal.

The first side cover 21 is formed opposite to the top of the first part 15b. The first side cover 21 may be bent downward (on the z-axis) from above the top of the first part 15b to be opposite to the light-in surface 16.

The second side cover 22 is formed opposite to the bottom of the first part 15b. The second side cover 22 may be bent upward (on the z-axis) from under the bottom of the first part 15b to be opposite to the light-in surface 16. A portion 22a of the second side cover 22 may be inclined along the bottom of the light guide plate 15, that is, a portion of the slope, and the light source 13 may be accommodated inside the second side cover 22.

The first side cover 21 and the second side cover 22 are fastened by first fixing members 51 such that the light source 13 and the light guide plate 15 are prevented from shaking, particularly in the z-axis direction, by external shock.

The second side cover 22 can support the slope of the light guide plate 15 to firmly maintain the arrangement of the light guide plate 15 and the light source 13 and protect them from external shock.

The first cover 21 may have first holes 41 formed at positions corresponding to the protrusions 30 of the first part 15b.

The first holes 41 may be formed larger than the protrusions 30 to fit and lock the protrusions 30. The circumference of the first hole 41 may be spaced apart from some of the edges of the locked protrusion 30 at a predetermined distance, in which the space may be a margin preventing the light guide plate 15 from deforming in expansion due to changes in the external environment around the light guide plate 15, for example, rapid increase of temperature. In this configuration, the other portions of the protrusion 30 may be in contact with the circumference of the first hole to increase the fixing force.

At least one second hole 42 may be further formed in the first side cover 21.

The second side cover 22 may have at least one third hole 43 at positions corresponding to the second holes 42.

The second and third holes 42, 43 are aligned straight in the z-axis direction such that the first side cover 21 and the second side cover 22 are firmly fixed by inserting the first fixing members 51. At least two pairs of second and third holes 42, 43 may be formed in one optical assembly 10 to ensure the fixing force. The second holes 42 and the third holes 43 may be formed at any positions in the first side cover 21 and the second side cover 22, respectively.

The second holes 42 may be aligned straight with the first holes 41 in the y-axis direction in the first side cover 21. In this case, the first side cover 21 and the second side cover 22 may be more firmly fixed by the combining force, between the light guide plate 15 and the first side cover 21, due to the first holes 41 and the protrusion 30 of the light guide plate 15, and the combining force, between the first side cover 21 and the second side cover 22, due to the second and third holes 42, 43 and the first fixing members 51.

Obviously, the positions of the holes and protrusions are not limited to the embodiment and may be anywhere as long as they can provide combining force between the light guide plate 15 and the side cover 20. That is, the fixing members can be inserted in the y-axis direction by forming the second and third holes at the overlapping sides of the first side cover 21 and the second side cover 22.

On the other hand, fourth holes 44 and fifth holes 45 where second fixing members 52 (see FIG. 10) fixing the optical assembly 10 to the bottom frame 110 are inserted may be further formed in the first side cover 21 and the second side cover 22.

The other portion of the optical assembly 10, except for the second part 15a of the light guide plate 15, is a first region that does not substantially provide light to the display panel, and the width of the first region may be further reduced in accordance with the arrangement relationship of the first holes 41, the second holes 42, and the third holes 43.

For example, the width of the first region may be further reduced when the second holes and the third holes 43 are positioned between the light emitting diodes than when they are positioned behind the light emitting diodes 11.

In this configuration, the first holes 41, the second holes 42, and the third holes 43 formed in the side cover 20 of the optical assembly 10 may have various shapes and the shapes are not limited to those shown in the drawings.

The first fixing members 51 may be bolts or fixing pins and are not limited thereto.

When the fixing members 51 are bolts, the inner sides of the second and third holes 42, 43 are threaded. Accordingly, it is possible to press and fix the light guide plate 15 and the light source 13 by inserting and tightening the first fixing members 51 in the second holes 42 and the third holes 43

The thickness of the portions around the second holes 42 and the third holes 43 may be formed thicker than the other portion or specific members may be used in the first and second side covers 21, 22 to ensure the pitch of the thread on the inner sides of the second holes 42 and the third holes 43.

The backlight unit 100 manufactured as described above may be accommodated inside the bottom frame having a box shape with the top open.

Figure 9:
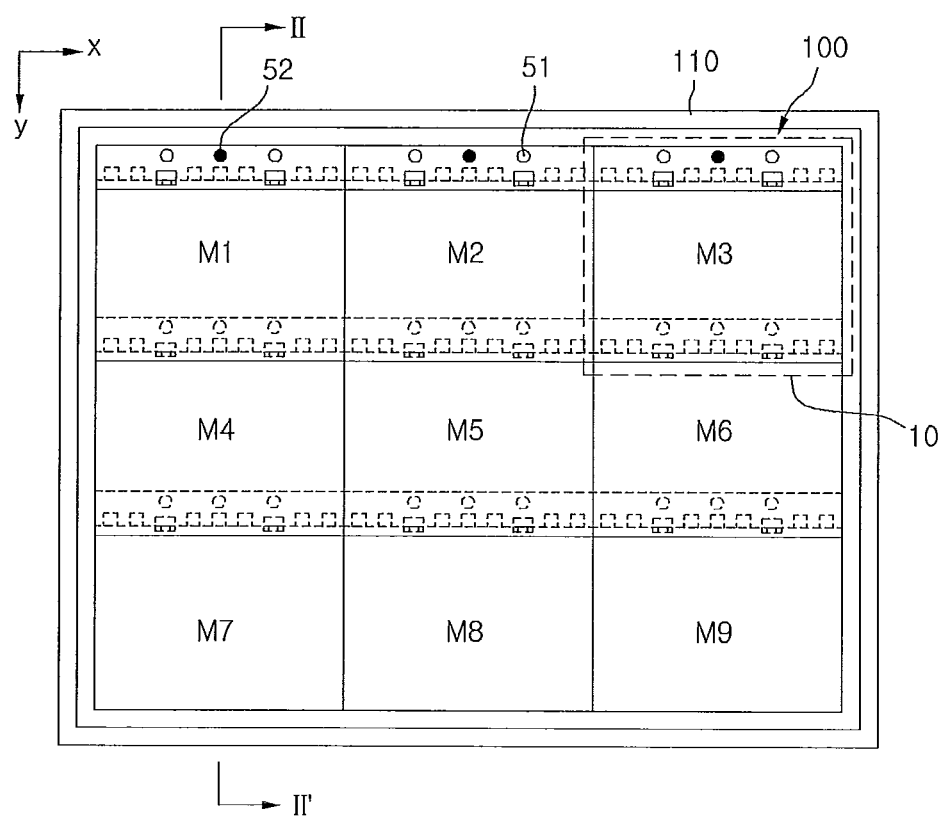
FIG. 9 is a plan view showing the backlight unit accommodated in a bottom cover according to an embodiment.
Figure 10:
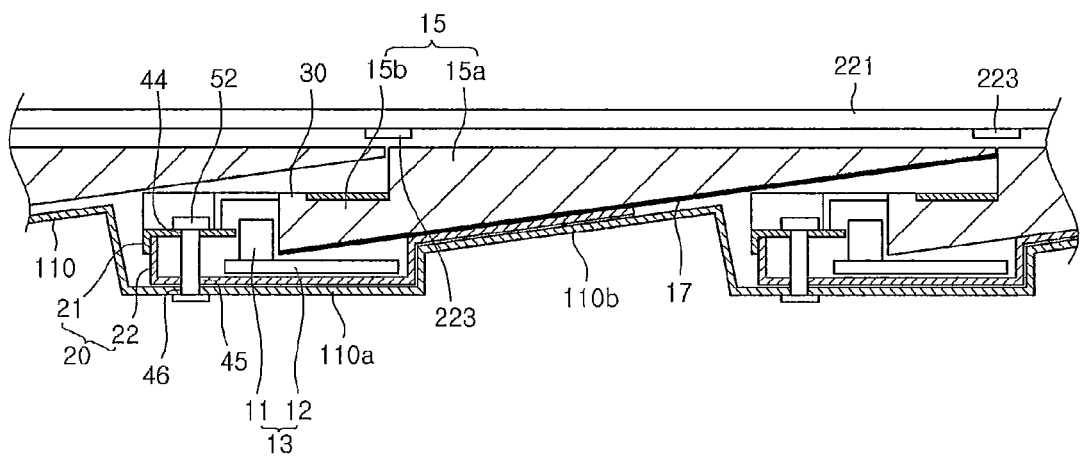
FIG. 10 is a cross-sectional view taken along line II-II' of FIG. 9.

FIG. 9 is a plan view showing the backlight unit accommodated in a bottom cover according to an embodiment and FIG. 10 is a cross-sectional view taken along line II-II' of FIG. 9. Further, FIG. 11 is a perspective view showing when one optical assembly is accommodated in the backlight unit according to an embodiment.

Figure 11:
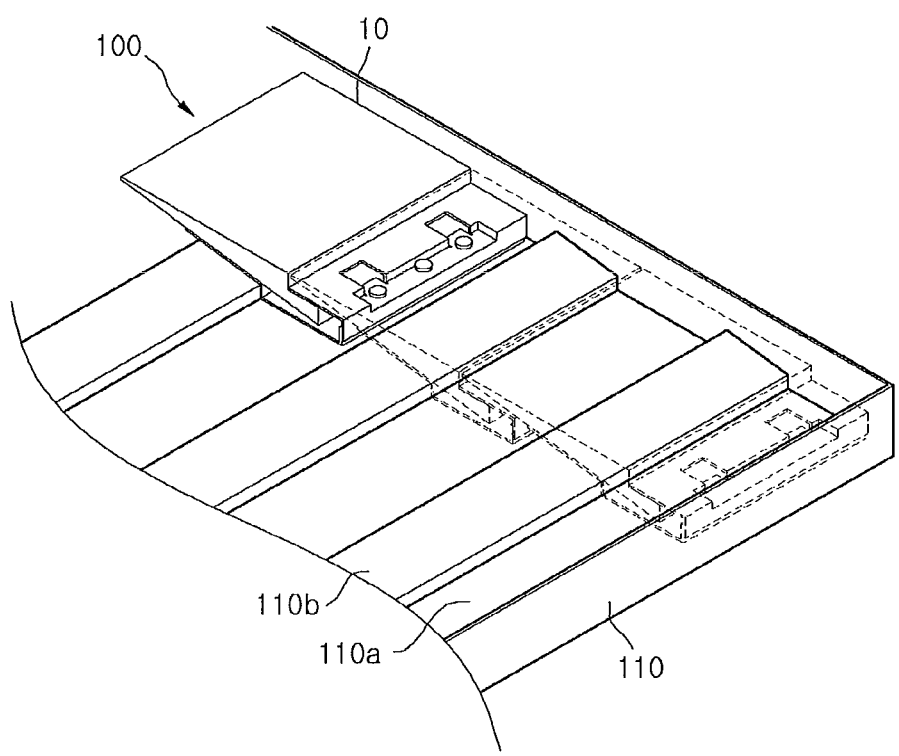
FIG. 11 is a perspective view showing when one optical assembly is accommodated in the backlight unit according to an embodiment.

For the same components as those shown in FIGS. 1 to 8, refer to the description of those shown in FIGS. 9 to 11, and repeated description is not provided.

As shown in FIG. 9, the backlight unit 100 is disposed inside the bottom frame 110 having a box shape with the top open.

The bottom frame 110 may be made of plastic or metal.

The backlight unit 100 can be simply assembled by vertically inserting the optical assemblies 10 inside the bottom frame 110.

The optical assemblies 10 placed on the bottom inside the bottom frame 110 may be fixed in places by fastening them the to the bottom frame 110 with the second fixing members 52.

The second fixing members 52 may be inserted in the fourth holes 44 formed in the first side cover 21 and the fifth holes 45 formed in the second side cover 22 to be correspond to the fourth holes 44 in the optical assembly 10, and sixth holes 46 formed through the bottom of the bottom frame 110 to correspond to the fourth and fifth holes 44, 45.

At lease one pair of fourth and fifth holes 44, 45 may be formed in one optical assembly 10.

Although the second fixing members 52 can fasten the optical assemblies 10 to the bottom frame 110 in the similar way to the first fixing members 51 described above, they are not limited thereto.

Further, it is possible to fix the optical assemblies 10 to the bottom frame 110 by inserting the first fixing members 51 into the sixth holes 46 of the bottom frame 110, even if the fourth and fifth holes 44, 45 are not formed in the side cover 20.

On the other hand, a specific hole through which a cable connecting the light source 13 with a control unit, such as a main controller, passes may be further formed in the side cover 20.

As shown in FIGS. 10 and 11, the backlight unit 100 is disposed on the bottom of the bottom frame 110 and the optical assemblies 10 are fastened and fixed to the bottom frame 110 by the second fixing members 52.

The optical assembly 10 has a flat top and an inclined bottom, taking the shape of the light guide plate 15. The bottom of the bottom frame 110 where the optical assemblies 10 are seated may have a convexo-concave structure, taking the shape of the bottom of the optical assemblies 10.

For example, a structure including the light source 13, the first part 15b of the light guide plate 15, and the side cover 20 may be disposed on the depression 110a of the bottom and the second part 15a of the light guide plate 15 may be disposed on the prominence 110b of the bottom. The depressions 110a and the prominences 110b may be alternately formed.

The bottom frame 110 having the above shape may be manufactured by press forming or extrusion molding.

The shapes of the depression 110a and the prominence 110b depend on the size and external shape of the optical assemblies 10, and are determined not only to maintain the angle of inclination of the bottom of the light guide plate 15, but to accommodate the optical assemblies 10.

Further, the bottom frame 110 having the convexo-concave bottom as described above may be advantageous in maintaining the shape and strength.

Recently, as panels increase in size, backlight units providing light to the panels increase in size; however, according to the embodiment, it does not need to provide specific structure and means around the bottom frame to maintain the shape of the bottom frame. Therefore, it is possible to easily and simply assemble a backlight unit and a display module. Further, it is possible to reduce weight of the backlight unit and the display module.

The embodiment may provide a backlight unit having a new structure and a display device. Further, the embodiment may provide a backlight unit having uniform luminance and a display device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a plurality of optical assemblies, each optical assembly including:
      a light source generating light;
      a light guide plate having a first part through which light travels inside;
      a second part diffusing the light traveling inside through the first part upwardly; and
      at least one protrusion protruding from a top of the first part; and
   a side cover fixing the light source and the light guide plate, wherein the side cover includes:
  a first side cover having a first bent portion, a first hole and a second hole; and
  a second side cover having a second bent portion and a third hole,
  wherein the first bent portion of the first side cover is coupled to the second bent portion of the second side cover to overlap each other in a side facing the light source,
wherein the first side cover contacts the first part between the at least one protrusion and the second part,
wherein the light source is disposed between the first side cover and the second side cover,
wherein the at least one protrusion is coupled to the first hole to fit and lock the at least one protrusion,
wherein the second and third holes are aligned such that the first side cover and the second side cover are fixed by inserting a fixing member, and
wherein the light source includes:
  a plurality of light emitting diodes disposed at a side of the first part; and
  a module substrate with the light emitting diodes mounted thereon,
  wherein the light emitting diodes are arranged diagonally with respect to the at least one protrusion, and
  wherein the distance between the light emitting diodes around the at least one protrusion is larger than the distance between the other light emitting diodes.

2. The backlight unit according to claim 1, wherein a diffusion plate is disposed on the light guide plates and having a diffusion pattern at positions which correspond to interfaces between the light guide plates.

3. The backlight unit according to claim 2, wherein the diffusion pattern is a pattern printed on the diffusion plate.

4. The backlight unit according to claim 2, wherein the diffusion pattern is made of a high-diffusion material having higher diffusion force than the diffusion plate.

5. The backlight unit according to claim 4, wherein the high-diffusion material is silicon including micro-balls.

6. The backlight unit according to claim 2, wherein the light guide plates are arranged in a matrix, and the diffusion pattern is arranged in a grid shape, corresponding to the interfaces between the light guide plates.

7. The backlight unit according to claim 2, wherein the diffusion pattern is in contact with the light guide plates.

8. The backlight unit according to claim 1, wherein the module substrate has a first region and a second region, the first region being adjacent the at least one protrusion, and
  wherein a distance between light emitting diodes in the first region is greater than a distance between light emitting diodes in the second region.

9. The backlight unit according to claim 1, wherein a reflective member is attached to the bottom of the light guide plate.

10. The backlight unit according to claim 1, wherein the side cover comprises a first side cover disposed above the light source and the first part, and a second side cover disposed under the first part.

11. A display device comprising:
a backlight unit including a plurality of optical assemblies, each optical assembly including:
  a light source generating light;
  a light guide plate having a first part through which light travels inside;
  a second part diffusing the light traveling inside through the first part upwardly; and
  at least one protrusion protruding from a top of the first part;
a side cover fixing the light source and the light guide plate; and
a display panel disposed above the backlight unit, provided with light from the backlight unit, and displaying video,
wherein the side cover includes:
  a first side cover having a first bent portion, a first hole and a second hole; and
  a second side cover having a second bent portion and a third hole,
  wherein the first bent portion of the first side cover is coupled to the second bent portion of the second side cover to overlap each other in a side facing the light source,
wherein the first side cover contacts the first part between the at least one protrusion and the second part,
wherein the light source is disposed between the first side cover and the second side cover,
wherein the at least one protrusion is coupled to the first hole to fit and lock the at least one protrusion,
wherein the second and third holes are aligned such that the first side cover and the second side cover are fixed by inserting a fixing member, and
wherein the light source includes:
  a plurality of light emitting diodes disposed at a side of the first part; and
  a module substrate with the light emitting diodes mounted thereon,
  wherein the light emitting diodes are arranged diagonally with respect to the at least one protrusion, and
  wherein the distance between the light emitting diodes around the at least one protrusion is larger than the distance between the other light emitting diodes.

12. The display device according to claim 11, wherein a diffusion plate is disposed on the light guide plates and having a diffusion pattern at positions which correspond to interfaces between the light guide plates.

13. The display device according to claim 12, wherein the diffusion pattern is a pattern printed on the diffusion plate.

14. The display device according to claim 12, wherein the diffusion pattern is made of a high-diffusion material having higher diffusion force than the diffusion plate.

15. The display device according to claim 14, wherein the high-diffusion material is silicon including micro-balls.

16. The display device according to claim 12, wherein the light guide plates are arranged in a matrix, and the diffusion pattern is arranged in a grid shape, corresponding to the interfaces between the light guide plates.

17. The display device according to claim 12, wherein the diffusion pattern is in contact with the light guide plates.

18. The display device according to claim 11, wherein the module substrate has a first region and a second region, the first region being adjacent the at least one protrusion, and
  wherein a distance between light emitting diodes in the first region is greater than a distance between light emitting diodes in the second region.

19. The display device according to claim 11, wherein a reflective member is attached to the bottom of the light guide plate.

20. The display device according to claim 11, wherein the side cover comprises a first side cover disposed above the light source and the first part, and a second side cover disposed under the first part.

* * * * *